United States Patent [19]

Pinson

[11] Patent Number: 4,875,374

[45] Date of Patent: Oct. 24, 1989

[54] MULTIPLE AXIS VIBRATION TEST PLATFORM

[75] Inventor: George T. Pinson, Huntsville, Ala.

[73] Assignee: The Boeing Company, Seattle, Wash.

[21] Appl. No.: 189,719

[22] Filed: May 3, 1988

[51] Int. Cl.[4] .............................................. B06B 3/00
[52] U.S. Cl. ........................................ 73/663; 73/667
[58] Field of Search ........................ 73/663, 664, 667; 403/131, 76, 128; 74/570

[56] References Cited

U.S. PATENT DOCUMENTS

| | | | |
|---|---|---|---|
| 3,044,292 | 7/1962 | Matthews | 73/71.6 |
| 3,277,697 | 10/1966 | Wittkuhns | 73/667 |
| 3,712,120 | 1/1973 | Fletcher et al. | 73/71.6 |
| 4,189,249 | 2/1980 | Gaines et al. | 403/76 |
| 4,245,705 | 6/1981 | Morita et al. | 74/42 |
| 4,265,123 | 5/1981 | Cappel | 73/663 |
| 4,422,334 | 12/1983 | Yasuda | 73/665 |
| 4,436,188 | 3/1984 | Jones | 73/663 |
| 4,446,742 | 5/1984 | Thompson, Jr. et al. | 73/663 |

Primary Examiner—John Chapman
Assistant Examiner—Michele Simons
Attorney, Agent, or Firm—Finnegan, Henderson, Farabow, Garrett & Dunner

[57] ABSTRACT

A multiple axis vibration test platform including a plurality of actuator arms connected to respective drive shafts with eccentric ball joints at first ends thereof, and at the opposite ends thereof to the bottom surface and side walls of the test platform with concentric ball joints. The eccentricity of the eccentric ball joint couplings correspond to the amplitude of vibration of the test platform along a respective axis of vibration. The ball joint couplings at each end of the actuator arms eliminate cross coupling of motion between the axes of vibration as the test platform is vibrated simultaneously in more than one axis.

14 Claims, 4 Drawing Sheets

MULTIPLE AXIS VIBRATION TEST PLATFORM

BACKGROUND OF THE INVENTION

1. Field of the Invention

The present invention relates to multiple axis vibration test platforms, and more particularly to a vibration test platform capable of providing single, dual, or three-axis fixed amplitude, variable frequency vibration.

2. Description of the Related Art

Vibration test equipment is widely used to test hardware to assure that it is developed to perform within the subjected environment. Vibration test equipment which can provide vibration in a single axis or in two axes are presently available. Vibration test equipment which can provide vibration in three axes is known but is not as readily available and requires complex control mechanisms to minimize cross coupling of motion in the various axes and cumbersome torque resisting apparatus to restrict rotation about the axes of vibration.

An example of a single axis vibration test platform is described in Wittkuhns U.S. Pat. No. 3,277,697. The Wittkuhns vibration test platform provides for continuous change of both frequency and amplitude of vibration in a single axis. Such vibration is accomplished by use of a drive shaft and actuator arms coupled to the drive shaft. The actuator arms are coupled to the vibration test platform by means of eccentrics at the coupling to the drive shaft and at the coupling to the test platform. These eccentric couplings at both ends of the actuator arms of Wittkuhns will not eliminate cross coupling should the test platform be vibrated in more than one axis since the eccentric is fixedly connected to both the drive shaft and the test platform. Thus, the Wittkuhns design does not permit sufficient flexibility in the eccentric couplings at the ends of the actuator arms to permit vibration in more than one axis.

An example of a multiple axis vibration test platform is described in Jones U.S. Pat. No. 4,436,188. The Jones vibration test platform utilizes a single hydraulic actuator along each of the respective axes of vibration with gimbal bearings disposed at each end of the actuator arms. Such gimbal bearings permit pure two-dimensional motion of each of the actuator arms at the respective couplings. Jones utilizes splines to restrict rotation of the test platform about an axis, however, such splines cannot restrict rotation about the third orthogonal axis since the gimbals only permit pure twodimensional motion. Thus, the multiple axis vibration test platform of Jones requires a very sophisticated control circuit to control each hydraulic actuator to sense the rotation of the table and counter such rotation by active forces along the respective actuators. Therefore, the multiple axis vibration test platform of Jones is extremely limited in its ability to provide vibration simultaneously in more than one axis since such vibrational motion would require counteractive forces to restrict rotation about a particular axis while also requiring a sophisticated control loop to control the amplitude of vibration of each hydraulic actuator.

A second example of a multiple axis vibration test platform is described in Cappel U.S. Pat. No. 4,265,123. Cappel utilizes torquer tubes attached to each edge of the vibration test platform to restrict rotation of the test platform about each orthogonal axis. Cappel utilizes only single actuators along each respective axis to provide vibration of the test platform along that axis. Cappel suffers from the drawback that separate torque tubes must be provided in an effort to eliminate rotation about a respective axis.

A still further example of a multiple axis vibration test platform is provided in Thompson et al U.S. Pat. No. 4,446,742. Thompson et al. utilize ball joints at each end of hydraulic actuators which provide for motion in each of the multiple axes. Thompson et al. further utilize torquer tubes on each axis to restrict rotation of the test platform about that respective axes. The Thompson et al. multiple axis vibration test platform suffers from the same drawbacks as do Cappel and Jones described above wherein the hydraulic actuators require sophisticated control loops to control the amplitude of vibration of each hydraulic actuator along each of the respective axes of vibration, and separate torque tube arrangements to prevent rotation about each of those axes while the platform is being vibrated.

With the foregoing drawbacks of prior art multiple axis vibration test platforms in mind, it is an object of the present invention to provide a multiple axis vibration test platform simple in construction and design which utilizes a relatively simple control loop to selectively vibrate the test platform in one, two, or three axes simultaneously.

It is a further object of the present invention to provide a simplified actuator arm arrangement for connection to a drive shaft and to the test platform wherein the actuator arm arrangement permits out of axis rotation of each arm while concurrently restricting vibration of the test platform about a respective axis.

Additional objects and advantages of the invention will be set forth in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

To achieve the foregoing objects, and in accordance with the purposes of the invention as embodied and broadly described herein, a multi-axis vibration test platform is provided comprising: a test platform having a top surface, a bottom surface, a side wall, and an end wall with the test platform being simultaneously movable along selected ones of first, second, and third axes of vibration which axes of vibration intersect at a center of the test platform. The test platform includes a plurality of actuator arms having first and second ends, and a plurality of rotatable drive shafts and means for independently rotating each of the drive shafts. A first means, including eccentrically coupled ball joints, is provided for connecting the first end of each actuator arm to a respective one of the plurality of drive shafts to reciprocate each of the actuator arms along a respective one of the axes of vibration in accordance with the eccentricity of the eccentrically coupled ball joint in response to rotation of the respective drive shaft to which the actuator arm is coupled. The vibration test platform further includes a second means, including concentrically coupled ball joints, for connecting the second end of each of the actuator arms to a respective one of the bottom surface, end wall, and side wall of the test platform. The concentrically coupled ball joints of the second connecting means permit out of axis rotation of the actuator arms relative to the test platform as the test platform is vibrated along two or three axes simultaneously.

It is further preferable that at least two of the plurality of actuator arms extend from each of the rotatable drive shafts and that the eccentrically coupled ball joints of the first connecting means of the at least two actuator arms be spaced apart along each rotatable drive shaft on opposite sides of a respective one of the axes of vibration. In this manner each of the actuator arms, connected to a respective drive shaft through the first connecting means, acts to restrict rotation of the test platform about the respective axis of vibration.

In a further embodiment of the present invention there is provided an actuator arm for a multi-axis vibration test platform. The actuator arm has first and second opposite ends and includes an eccentric ball joint disposed in the first end of the actuator arm and a concentric ball joint disposed in the second end of the actuator arm.

BRIEF DESCRIPTION OF THE DRAWINGS

The accompanying drawings, which are incorporated in and constitute a part of the specification, illustrate a preferred embodiment of the invention and, together with the general description given above and the detailed description of the preferred embodiment given below, serve to explain the principles of the invention.

DESCRIPTION OF THE PREFERRED EMBODIMENT

Reference will now be made in detail to the present preferred embodiment of the invention as illustrated in the accompanying drawings.

Figure 1:
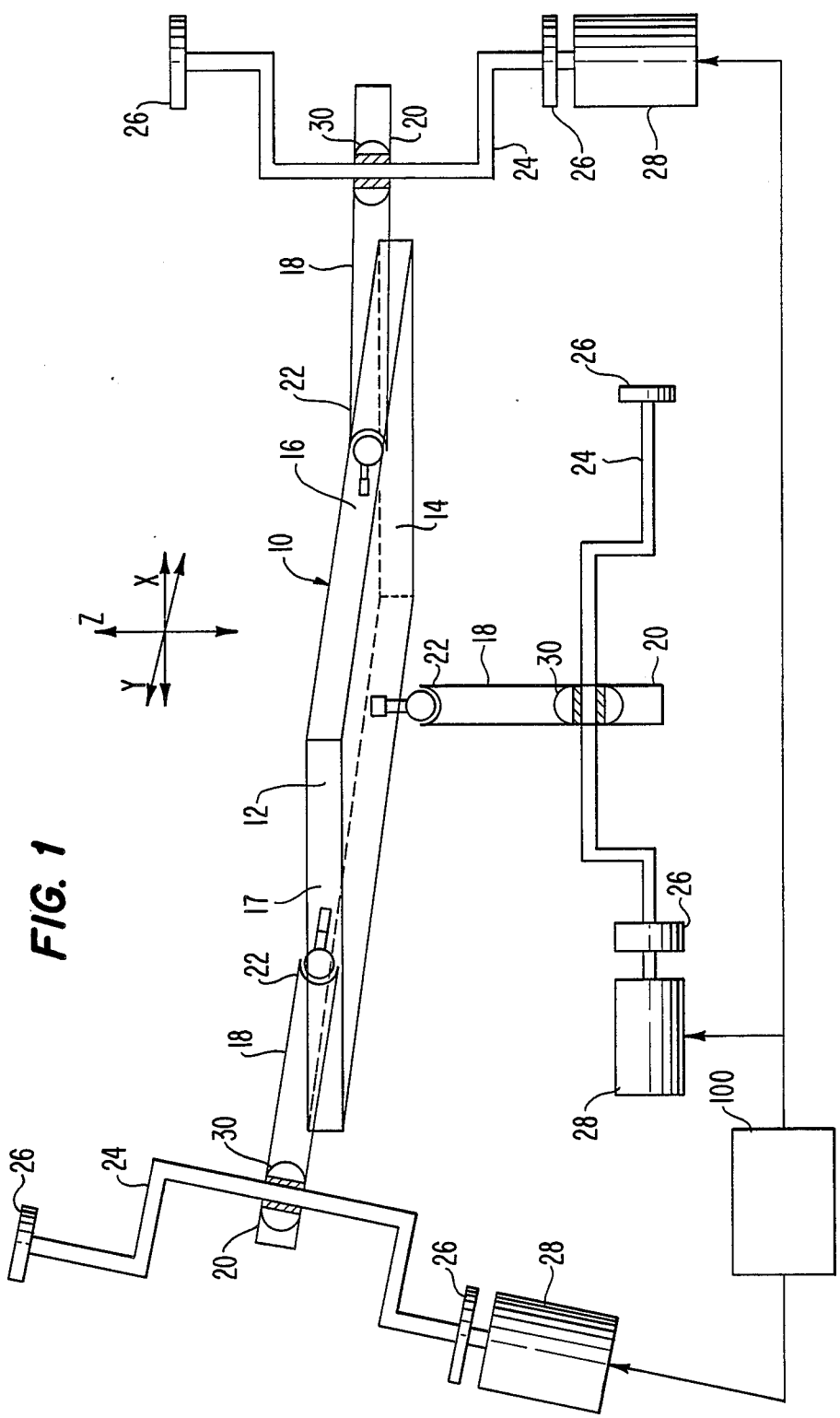
FIG. 1 is a schematic representation of a preferred embodiment of the present invention which illustrates eccentric and concentric connections of the respective ends of the actuator arms to the test platform and the drive shafts.

With reference to FIG. 1, and in accordance with the present invention, there is provided a multi-axis vibration test platform 10 having a top surface 12, a bottom surface 14, a side wall 16, and an end wall 17. The multi-axis vibration test platform further includes a plurality of actuator arms 18 having first ends 20 and second ends 22, and a plurality of rotatable drive shafts 24. Drive shafts 24 are journalled at each end in bearings 26 and are connected to motors 28 which in the preferred embodiment comprise means for rotating drive shafts 24. As illustrated in FIG. 1, and by way of example and not limitation, each drive shaft 24 is connected to a separate motor 28 for independently rotating a respective drive shaft 24. However, it is well within the scope of the present invention that each drive shaft 24 may be operably connected to a single drive motor utilizing a clutch mechanism or the like well known in the art such that any one or combination of drive shafts 24 may be rotated by the single drive motor.

Test platform 10 is simultaneously movable along first, second or third axes of vibration represented in FIG. 1 by the coordinate system labeled with axes X, Y and Z. Axes X, Y, and Z correspond respectively to the first, second, and third axes of vibration and will be referred to as the former in the remainder of this disclosure. For purposes of describing the preferred embodiment of the present invention, axes X, Y and Z are mutually orthogonal and each drive shaft 24 is disposed substantially parallel to a respective one of the X, Y and Z axes. The present invention is not limited to a test platform simultaneously movable along three mutually orthogonal axes of vibration and any desired non-orthogonal coordinate system for the axes of vibration may be selected to simulate a desired operational environment.

Figure 2:
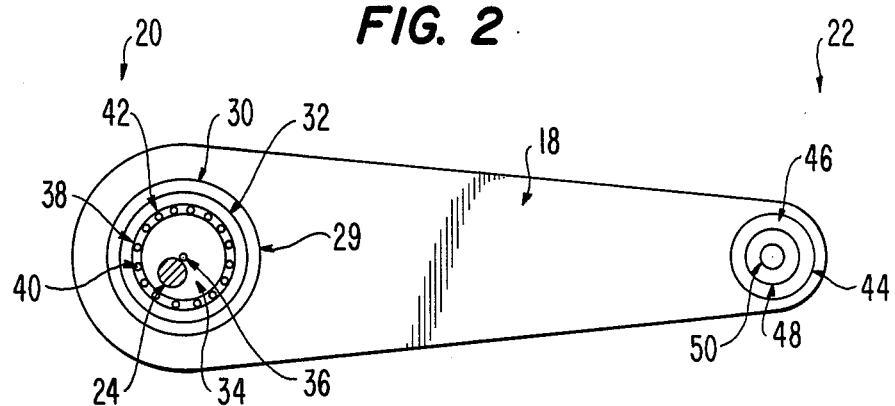
FIG. 2 is a detailed side view of the actuator arm of the present invention illustrating the eccentric and concentric ball joints disposed in respective first and second ends of the actuator arm.

In accordance with the present invention, the vibration test platform includes first means, including eccentrically coupled ball joints, for connecting the first end of each of the actuator arms to a respective one of the plurality of drive shafts. As embodied herein and with reference to FIG. 2, the first connecting means includes eccentrically coupled ball joint 29 comprising a socket 30 formed in first end 20 of each actuator arm 18, a ball 32 pivotably held in socket 30, and a cam 34, having a cam centerline 36, rotatably held in ball 32. In the preferred embodiment of the present invention, cam 34 is rotatably held in ball 32 with a cam bearing 38 having an inner race 40 and an outer race 42. Bearing 38 enables cam 34 to rotate within ball 32. Drive shaft 24, shown in cross section in FIG. 2, is fixedly attached to cam 34 at a position offset from cam centerline 36. The offset of drive shaft 24 relative cam centerline 36 corresponds to the eccentricity of eccentrically coupled ball joint 29 of the first connecting means. Thus, as drive shaft 24 is rotated cam 34 rotates within bearing 34, with the corresponding action reciprocating actuator arm 18 along a respective axis of vibration with an amplitude corresponding to the eccentricity or offset of shaft 24 from cam centerline 36.

Figure 3:
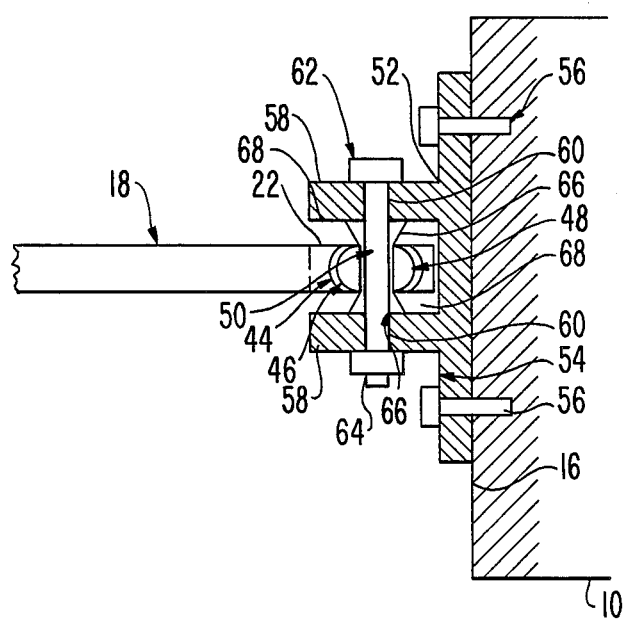
FIG. 3 is a detailed plan side view in partial cross section of the preferred embodiment of the second connecting means, including a concentric ball joint, of each of the plurality of actuator arms.

In accordance with the present invention the vibration test platform further includes second means, including concentrically coupled ball joints, for connecting second end 22 of each actuator arm 18 to a respective one of bottom surface 14, side wall 16, and end wall 17 of test platform 10. With reference to FIGS. 2 and 3 and as embodied herein, the second connecting means includes a concentrically coupled ball joint 44 comprising a socket 46 formed in second end 22 of actuator arm 18, and a ball 48 pivotably held in socket 46. Ball 48 includes a centrally positioned hole 50 extending therethrough. A hinge 52 having a base portion 54 is fixedly attached to a respective one of bottom surface 14, side wall 16, and end wall 17 of test platform 10 with attachment bolts 56, or by welding, or by other means. Hinge 52 further includes two spaced retaining portions 58 extending perpendicularly from base portion 54. Each retaining portion 58 includes an aperture 60 extending therethrough and an inner surface 68. Apertures 60 are aligned with centrally positioned hole 50 in ball 48 and a bolt or rod 62 is inserted through apertures 60 of retaining portions 58 and centrally positioned hole 50 of ball 48 and secured with a nut 64 or the like at the opposite side thereof.

With the second connecting means embodied as described above, concentrically mounted ball joints 44 disposed in the second ends 22 of each actuator arm 18 attach each actuator arm 18 to test platform 10 while still permitting out of axis rotation of actuator arm 18 relative to test platform 10. Similarly, eccentric ball joint 29 disposed in first end 20 of each actuator arm 18 permits out of axis rotation of actuator arm 18 relative the respective drive shaft 24 to which the actuator arm is attached.

With first and second connecting means of respective ends of each actuator arm 18 embodied as described above, each actuator arm may pivot in three dimensions about each first end 20 and each second end 22 as the actuator arms are reciprocated along one of the axes of vibration by rotation of shaft 24 and cam 34 in cam bearing 38. In practice, while test platform 10 is vibrated in three axes simultaneously by rotation of each drive shaft 24, the pivotable connections formed by eccentric ball joints 29 and concentric ball joints 44 at each end of actuator arms 18 eliminate cross coupling of motion along each of the axes of vibration to thereby permit pure three dimensional vibrational motion of the test platform. Furthermore, the spaced relationship of retaining portions 58 of hinge 52 permit actuator arm 18 to pivot about concentric ball joint 44 without engaging or hitting retaining portions 58 as the test platform is vibrated. The test platform may be vibrated along one or two axes of vibration simply by rotating only one or two of the respective drive shafts. The amplitude of vibration of test platform 10 along each axis of vibration is determined in accordance with the eccentricity of eccentrically coupled ball joints 29. To change the amplitude of vibration along a respective axis cam 34 is replaced with a different cam having a different offset between cam centerline 36 and shaft 24.

It is preferable that each retaining portion 58 of hinge 52 of the second connecting means includes means for aligning centrally positioned hole 50 of ball 48 with apertures 60 of each retaining portion 58, and for limiting movement of concentric ball joint 44 along bolt 62 between retaining portions 58. As embodied herein, the aligning means includes tapered, self-centering elements 66 positioned on opposing surfaces 68 of retaining portions 58. Tapered self-centering elements 66 are preferably configured with a conical outer contour. The topmost portion of each conically contoured self-centering element 66 is spaced from the other self-centering element 66 by a distance which permits insertion of second end 22 of actuator arm 18 therebetween and which permits actuator arm 18 to pivot about concentric ball joint 44 without contacting retaining portions 58. Since each self-centering element 66 has a conically shaped outer contour and is aligned with the centrally positioned hole 50 of ball 46, second end 22 of each actuator arm 18 is restricted from sliding along bolt 62 between spaced retaining portions 58.

Figure 4:
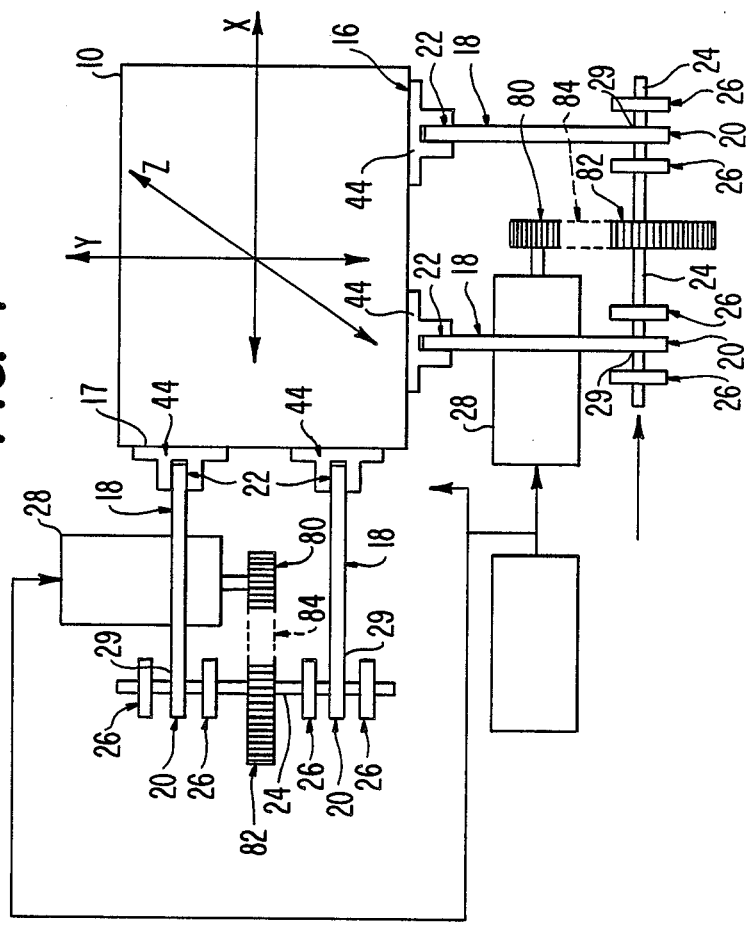
FIG. 4 is a second schematic plan view of a vibration test platform according to the present invention illustrating the operable connection of the at least two actuator arms extending from each drive shaft to the test platform and also illustrating a preferred embodiment of the means for operably connecting the drive means to each drive shaft.

In accordance with the present invention and as illustrated in FIG. 4, it is preferable that each rotatable drive shaft 24 includes at least two of the plurality of actuator arms 18 extending therefrom.

Figure 5:
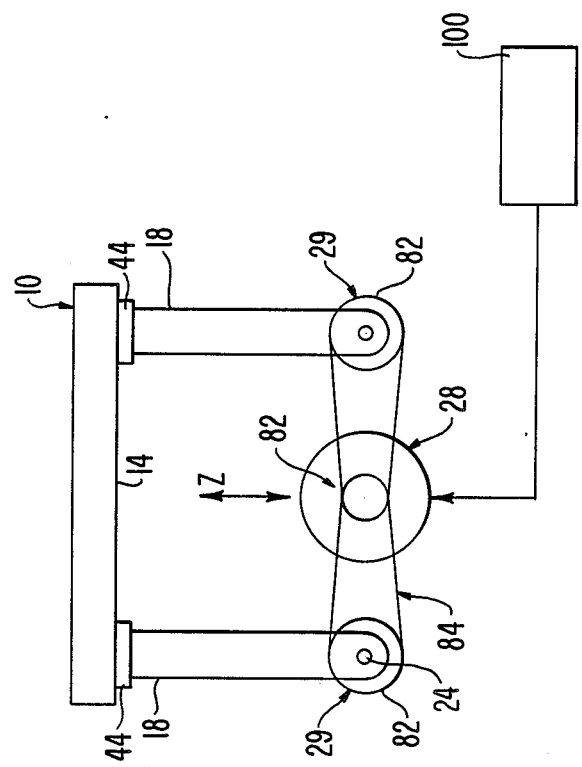
FIG. 5 is an elevation view of the vibration test platform of FIG. 4.

FIG. 4 is a plan view of a vibration test platform incorporating the teachings of the present invention and therefor only illustrates actuator arms 18 connected to side wall 16 and end wall 17 and drive shafts 24 which reciprocate test platform 10 in the X and Y axes. At least one third drive shaft 24 with actuator arms 18 connected at first end 20 thereto, and to bottom surface 14 at second end 22, is disposed immediately below test platform 10 and is identical in construction to the X- and Y-axis drive shafts and actuator arms. FIG. 5 illustrates an elevation view of the vibration test platform of FIG. 4 and shows two drive shafts 24 disposed below test platform 10 for vibration along the Z-axis. As shown, the two drive shafts 24 for vibration along the Z-axis are disposed parallel to one another on opposite sides of the Z-axis. At least two actuator arms 18 extend from each shaft 24 and are connected at second ends 22 thereof to bottom surface 14.

Since the construction and coupling of each actuator arm 18 to a respective drive shaft 24 and bottom surface 14, side wall 16 or end wall 17 is identical, only one will be described herein for ease in presentation.

Eccentrically coupled ball joints 29 are disposed in first ends 20 of each actuator arm 18 and are spaced apart on each rotatable drive shaft 24 and extend substantially perpendicularly therefrom on opposite sides of a respective one of the X and Y axes of vibration as illustrated in FIG. 4. Rotatable drive shafts 24 are aligned in parallel with respective ones of the axes of vibration of the test platform.

Actuator arms 18 extending from drive shaft 24 and connected at second ends 22 thereof to side wall 16 to vibrate platform 10 along the Y-axis as shaft 24 is rotated. Similarly, actuator arms 18 attached at second ends 22 thereof to end wall 17 reciprocate test platform 10 along the X-axis as that drive shaft 24 is rotated. Since each of second ends 22 of the respective actuator arms 18 are attached to test platform 10 on opposite sides of the respective Y- and X-axes, rotation of test platform 10 about the X- and Y-axis is restricted since drive shaft 24 is rigidly held in journal bearings 26 and the connections of actuator arms 18 to the test platform and to the drive shaft will not permit the actuator arms to rotate about the Y-axis or the X-axis. The present invention, by connecting at least two actuator arms 18 to each drive shaft 24 on opposite sides of a respective axis of vibration restricts rotation about that respective axis of vibration.

Similarly and with reference to FIG. 5, actuator arms 18 which are attached to bottom surface 14 of test platform 10 are positioned on opposite sides of the Z-axis and extend perpendicularly from respective drive shafts 24 thereby restricting rotation of test platform 10 about the Z-axis. Moreover, if the Z-axis corresponds to the direction of the force of gravity, it is preferable that test platform 10 be vibrated along that axis by at least two drive shafts 24 positioned in parallel on opposite sides of the Z-axis. Each drive shaft 24 includes at least two actuator arms extending therefrom and connected to bottom surface 14 with concentric ball joints 44. In this manner any moment forces placed on test platform 10 about the X and Y axis by the weight of the test object resting on top surface 12 may be opposed by the journal bearings 26 and drive shafts 24 which provide motion along the Z-axis.

With reference to FIGS. 2 and 4, where at least two actuator arms 18 are coupled to each drive shaft 24, the eccentricity of each of eccentrically coupled ball joints 29 of the respective pair of actuator arms 18 are disposed in substantially identical orientation with respect to one another and with respect to the axis of rotation of drive shaft 24. It is important that the eccentrically coupled ball joints 29 of each actuator arm 18 extending from the same drive shaft 24 be positioned in phase with respect to one another so that as drive shaft 24 is rotated to reciprocate each actuator arm 18 along a respective axis, the amplitude of vibration of the test platform and each actuator arm is in phase so as not to place unbalanced forces on test platform 10 and drive shaft 24. However, the eccentricity of ball joints 29 which correspond to the amplitude of vibration along a respective X, Y, or Z axis need not be identical for each axis of vibration. In other words, the respective amplitudes of vibration along the X-, Y-, and Z-axes may be different from one another by selecting any desired offset between cam centerline 36 and drive shaft 24.

With reference to FIG. 4, in the preferred embodiment of the present invention each motor 28 is operably connected to a drive pulley 80. Drive pulley 80 is in turn connected to a cam pulley 82 disposed on drive shaft 24 through a drive belt 84. Pulleys 80 and 82 and drive belt 84 may be of the non-slip cog variety to eliminate slippage therebetween. With reference to FIG. 5, a single motor 28 may be coupled to both drive shafts 24 producing vibration in the Z-axis by disposing two drive pulleys 80 on the motor shaft and connecting each drive pulley to a respective cam pulley 82. The respective diameters of the drive pulley and cam pulley may be chosen to meet desired vibrational frequencies at favorable motor powers and RPMs. Such selection of favorable motor powers and RPMs to meet the load conditions and desired vibrational frequencies may be easily made by one skilled in the art.

A controller 100 for controlling motors 28 may be provided to selectively activate and deactivate respective ones of motors 28 to select which axes of vibration the test platform is to be vibrated along. As further embodied herein, controller 100 may comprise a microprocessor which can be programmed in any desired way to control motors 28. In this manner the vibration test platform of the present invention may be selectively used in a single axis, dual axis, or three axis mode. Furthermore, if motors 28 are selected to have variable RPM characteristics, controller 100 may be programmed to selectively adjust the motor RPM to provide continuously adjustable frequencies of vibration along each axis.

The teachings of the present invention may also be incorporated in a "slip table" type of vibration test platform wherein actuator arms according to the present invention are connected to two drive shafts which vibrate the table in the X-and Y-axes. In such a construction, test platform 10 would rest directly on a surface over which the platform is configured to slide and the Z-axis actuator arms and drive shafts are eliminated.

Furthermore, any complex motion of the test platform 10 other than pure linear three dimensional motion may be simulated by replacing the single cam 34 disposed in ball joint 29 with a couplex cam and cam follower disposed in ball joint 29. Moreover, by adjusting the phase relationship of cams 34 between each of the axes of vibration, i.e., the phase relationship between cams producing vibration in the X-axis relative to cams producing vibration in the Y- or Z-axis, an orbital cushionshaped motion envelope can be reproduced.

Additional advantages and modifications will readily occur to those skilled in the art. The invention in its broader aspects is, therefore, not limited to the specific details, representative apparatus, and illustrative examples shown and described. Accordingly, departures may be made from such details without departing from the spirit or scope of applicant's general inventive concept.

What is claimed is:
1. A multi-axis vibration test platform, comprising:
 a test platform having a top surface, a bottom surface, side walls, and end walls, said platform being simultaneously movable along selected ones of first, second, and third axes of vibration which intersect at a center of said test platform;
 a plurality of actuator arms having first and second ends;
 a plurality of rotatable drive shafts and means for independently rotating each of said drive shafts;
 first means, including eccentrically coupled ball joints, for connecting said first end of each said actuator arm to a respective one of said plurality of drive shafts to reciprocate each said actuator arm along a respective one of said axes in accordance with the eccentricity of said eccentrically coupled ball joint as said respective drive shaft is rotated;
 second means, including concentrically coupled ball joints, for connecting said second end of each said actuator arm to a respective one of said bottom surface, side walls, and end walls of said test platform, said concentrically mounted ball joints permitting out of axis rotation of said actuator arms relative to said test platform.

2. The multi-axis vibration test platform of claim 1, wherein each said rotatable drive shaft includes at least two of said plurality of actuator arms extending therefrom, said eccentrically coupled ball joints of said first connecting means of said first ends of said at least two actuator arms being spaced apart on each said rotatable drive shaft on opposite sides of a respective one of said axes to restrict rotation of said test platform about said respective axis.

3. The multi-axis vibration test platform of claim 2, wherein each one of said rotatable drive shafts is aligned in parallel with a respective one of said first, second, and third axes of vibration of said test platform with said at least two actuator arms of each said rotatable drive shaft extending perpendicularly therefrom.

4. The multi-axis vibration test platform of claim 3, wherein said first, second, and third axes of vibration are orthogonal to one another.

5. The multi-axis vibration test platform of claim 2, wherein the eccentricity of said eccentrically coupled ball joints of said first connecting means corresponds to an amplitude of vibration of said test platform along a respective axis, and wherein the eccentricity of each said eccentrically coupled ball joint of said at least two actuator arms are disposed in substantially identical orientation with respect to one another and relative to said respective drive shaft.

6. The multi-axis vibration test platform of claim 1, wherein said eccentrically coupled ball joints include a socket formed in said first end of each said actuator arm, a ball pivotably held in said socket, and a cam rotatably held in said ball, said cam having a center and being fixedly attached to said respective drive shaft at a position offset from said center of said cam, said offset corresponding to said eccentricity of said eccentrically coupled ball joint.

7. The multi-axis vibration test platform of claim 6, including a bearing disposed between said cam and said ball.

8. The multi-axis vibration test platform of claim 1, wherein said concentrically coupled ball joints include a socket formed in said second end of each said actuator arm and a ball pivotably held in said socket, said ball including a centrally positioned hole extending therethrough; said second connecting means further including a hinge having a base portion, fixedly attached to a respective one of said bottom surface, side walls, and end walls of said test platform, and two spaced retaining portions extending perpendicularly from said base portion and parallel to one another, each said retaining portion having an aperture therethrough aligned with said centrally positioned hole of said ball, said ball being held between said retaining portions with an attachment bolt extending through said apertures and said centrally positioned hole.

9. The multi-axis vibration test platform of claim 8, including a bearing disposed between said ball and said socket.

10. The multi-axis vibration test platform of claim 8, wherein each said retaining portion includes means for aligning said hole of said ball and said apertures of said retaining portion and for limiting movement of said ball along said attachment bolt between said retaining portions.

11. The multi-axis vibration test platform of claim 10, wherein said aligning means includes tapered, self-centering elements positioned around said apertures on opposing surfaces of said retaining portions.

12. The multi-axis vibration test platform of claim 1, wherein said means for independently rotating each of said drive shafts includes a plurality of motors, operably connected to respective ones of said plurality of drive shafts.

13. The multi-axis vibration test platform of claim 12, including control means for activating and deactivating selected ones of said motors to rotate corresponding ones of said drive shafts and reciprocate said test platform along respective ones of said axes.

14. The multi-axis vibration test platform of claim 13, wherein said control means includes means for varying the frequency of rotation of each said drive shaft to adjust the frequency of vibration of said test platform along a respective one of said axes.

* * * * *

UNITED STATES PATENT AND TRADEMARK OFFICE
CERTIFICATE OF CORRECTION

PATENT NO. : 4,875,374

DATED : October 24, 1989

INVENTOR(S) : George T. Pinson

It is certified that error appears in the above-identified patent and that said Letters Patent is hereby corrected as shown below:

Column 1, line 48, change "twodimensional" to --two-dimensional--.

Column 7, lines 62-63, change "cush-ionshaped" to --cushion-shaped--.

Signed and Sealed this

Fifth Day of March, 1991

Attest:

HARRY F. MANBECK, JR.

Attesting Officer

Commissioner of Patents and Trademarks